United States Patent [19]

Petit

[11] Patent Number: 4,704,261

[45] Date of Patent: Nov. 3, 1987

[54] METHOD FOR FLUORINATION OF URANIUM OXIDE

[75] Inventor: George S. Petit, Oak Ridge, Tenn.

[73] Assignee: The United States of America as represented by the United States Department of Energy, Washington, D.C.

[21] Appl. No.: 486,738

[22] Filed: Jan. 17, 1955

[51] Int. Cl.$^4$ ............................................. C01G 43/06
[52] U.S. Cl. ................................................... 423/258
[58] Field of Search ...................... 23/14.5; 423/3, 258, 423/260, 261

[56] References Cited

U.S. PATENT DOCUMENTS

| | | | |
|---|---|---|---|
| 2,535,572 | 12/1950 | Hainer | 423/258 |
| 2,804,369 | 8/1957 | Fowler | 423/258 |
| 2,810,626 | 10/1957 | Fowler | 423/258 |

Primary Examiner—John F. Terapane
Assistant Examiner—Virginia B. Caress
Attorney, Agent, or Firm—Stephen D. Hamel; Judson R. Hightower

[57] ABSTRACT

Highly pure uranium hexafluoride is made from uranium oxide and fluorine. The uranium oxide, which includes $UO_3$, $UO_2$, $U_3O_8$ and mixtures thereof, is introduced together with a small amount of a fluorine-reactive substance, selected from alkali chlorides, silicon dioxide, silicic acid, ferric oxide, and bromine, into a constant volume reaction zone. Sufficient fluorine is charged into the zone at a temperature below approximately 0° C. to provide an initial pressure of at least approximately 600 lbs/sq. in. at the ambient atmospheric temperature. The temperature is then allowed to rise in the reaction zone until reaction occurs.

7 Claims, No Drawings

METHOD FOR FLUORINATION OF URANIUM OXIDE

My invention relates to an improved and rapid method for the preparation of highly pure uranium hexafluoride from uranium oxide with fluorine.

The isotopes of the uranium are currently being separated on a momentus scale by the gaseous diffusion of uranium hexafluoride.

Briefly, a system for separating uranium isotopes consists of a large number of diffusion units (called "converters"), each containing a porous membrane or barrier, usually in tubular form and composed of a corrosion-resistant metal such as nickel. Included are means for charging to one side of the barrier, at subatmospheric pressure, a mixture of uranium isotopes in the form of gaseous uranium hexafluoride, means for withdrawing from the opposite side of the barrier the resulting diffused uranium hexafluoride fractions now enriched in the lighter isotopes of uranium and means for withdrawing the resulting undiffused fraction of uranium hexafluoride which is enhanced in the heavier isotopes of uranium. The stages are connected so that the diffused fraction from each is passed to the charging means of the succeeding stage in one direction, while the undiffused fraction from each stage is passed to the charging means of a succeeding stage in the opposite direction. By this arrangement, called a cascade arrangement, there are eventually concentrated at the opposite end stages of the system two fractions, one containing a substantially increased proportion of the lighter constituents of the starting mixture and the other containing a substantially increased proportion of the heavier constitutents thereof.

Tremendous amounts of uranium hexafluoride, usually ton quantities, must be prepared daily from the oxide for introduction into the cascade for isotopic separation. In addition to production purposes, there are many other needs for uranium hexafluoride at such gaseous diffusion plants and in research laboratories. For example, there is a constant monitoring, usually by mass spectrometer means, of the quality feed material. As a result of this monitoring, feed material may be inserted into the cascade at different points according to minor isotopic variations. Also, small quantities of uranium hexafluoride are prepared for testing separation characteristics of individual converters, the results of which are a basis for replacement, decontamination or repair of converters. These are but a few of numerous possible examples of the need for uranium hexafluoride in the general operation of gaseous diffusion plants.

It is requisite that the preparation method of uranium hexafluoride be rapid, simple, and safe. Furthermore, it is necessary that the method provides a product of high purity and in excellent yield. Previous to the present invention, uranium hexafluoride has been prepared on a large scale by hydrogenation of higher uranium oxides to uranium dioxide, hydrofluorination of the dioxide to the tetrafluoride, followed by fluorination to the hexafluoride. On a smaller scale, uranium oxide has been coverted to uranium hexafluoride with gaseous fluorine at a temperature of 300°–400° C., and with liquid bromine trifluoride. The standard laboratory method of preparation was with solid cobalt trifluoride at elevated temperatures. All these methods were time consuming, about several hours being required for the preparation. Furthermore, yields were relatively poor and samples were frequently rejected for failure to meet purity requirements.

An object of my present invention, therefore, is to provide a rapid method for the fluorination of uranium oxide to uranium hexafluoride.

Another object is to provide a rapid method for the fluorination of uranium oxide to uranium hexafluoride in excellent yield and purity.

Another object is to provide a relatively low temperature, safe and efficient method for the fluorination of uranium oxide to uranium hexafluoride.

Other objects and advantages of my invention will be apparent from the following detailed description and the claims appended hereto.

In accordance with my invention, uranium oxide may be converted to uranium hexafluoride by introducing said oxide, together with a small amount of fluorine-reactive substance, into a constant volume reaction zone, charging sufficient fluorine into said zone at a temperature below approximately 0° C. to provide an initial pressure of at least approximately 600 lbs/sq.in. at the ambient atmospheric temperature, and then permitting the temperature to rise in said reaction zone until reaction ensues.

I find that, employing the herein described conditions, the fluorine-uranium oxide reaction, once initiated, is virtually instantaneous and strongly exothermic. The stoichiometric yield, particularly when employing a stoichiometric excess of fluorine, is nearly one hundred percent and the uranium hexafluoride is of much higher purity than that produced by the cobalt trifluoride and bromine trifluoride methods. The overall time for a sample preparation is immensely less than by prior art methods. For example, approximately several hours are required for the high-temperature gaseous fluorine and the cobalt trifluoride fluorination of only two grams of uranium oxide. In striking contrast, as much as ten grams of uranium oxide may be fluorinated to uranium hexafluoride by my method in only fifteen minutes, which times includes all associated laboratory operations. This simplification and improvement of uranium hexafluoride sample preparation, especially when compounded by hundreds of such preparations per day, immensely improves the efficiency and work output of the analytical laboratories monitoring feed material for the gaseous diffusion cascades. Furthermore, my invention is uniquely adaptable and satisfactory for large scale preparation of uranium hexafluoride for production purposes.

My method, curiously, is not satisfactory for the fluorination of uranium tetrafluoride to uranium hexafluoride. This is quite surprising, since uranium tetrafluoride is regarded as relatively easy to convert into uranium hexafluoride, while uranium oxides are considered rather difficult to fluorinate.

I attribute the success of my invention in considerable degree to the inclusion of a small amount of fluorine-reactive subtance with the uranium oxide. As used herein and in the appended claims, the term "fluorine-reactive substance" or "activator" is intended to embrace an inorganic compound which spontaneously, exothermically reacts with fluorine at a pressure of at least approximately 600 lbs/sq.in. at a temperature at least as low as the ambient atmospheric temperature. Preferably, the activator should react with fluorine at a temperature between approximately 0° C. and −10° C. at an initial pressure of at least approximately 600 lbs/sq.in. It is suggested that the fluorine-activator reaction in some manner triggers the fluorine-uranium oxide reaction.

I find that eminently suitable fluorine-reactive substances, which react with fluorine at a temperature between approximately 0° C. and approximately −10° C. at a pressure of at least approximately 600 lbs/sq.in., are alkali chlorides, bromine, silicic acid, silicon dioxide and ferric oxide, while potassium chloride is preferred. Lithium fluoride, sodium borate and chromium oxide, which do not react with fluorine under the specified conditions, have proven unsatisfactory. Although the amount of the activator may satisfactorily vary over a considerable range, it is naturally desirable to employ the minimum amount needed to obtain an efficient reaction. Thus, at least approximately one part activator to two thousand parts uranium oxide, by weight, is satisfactory, while a weight ratio of approximately one part activator to one thousand parts uranium is preferred.

An initial pressure of at least approximately 600 lbs/sq.in. at the ambient atmospheric temperature appears to be necessary, in addition to the activator, for the fluorination reaction, while an initial pressure of approximately 800–900lbs/sq.in. is prefererd. Sufficient fluorine to obtain such pressures may be reached, in one satisfactory manner, by charging fluorine into a constant volume reaction zone at a temperature below approximately 0° C. The vapor pressure of fluorine decreases at lower temperatures, until at approximately liquid nitrogen temperatures (−189° C.), sufficient fluorine has condensed to yield a vapor pressure of only approximately onehalf atmosphere. As the temperature of the reaction zone is permitted to rise, the vapor pressure of the fluorine increases. The amount of fluorine necessary to yield the necessary pressures, and hence the charging temperature below 0° C., is of course dependent upon the reaction zone volume. Furthermore, the amount of fluorine should also meet stoichiometric requirements, a stoichiometric excess of approximately 200% being preferred. This fluorine-charging procedure to obtain the necessary initial pressure is a consequence of fluorine supply tanks commonly being pressurized to only approximately 30–40 lbs/sq.in. to reduce leakage hazards.

In a preferred method of conducting my invention, comminuted uranium oxide, together with a small amount of potassium chloride, may be introduced into a metal reactor, preferably of nickel, monel, or copper. The reactor may be cooled in a bath of a suitable refrigerant, such as liquid nitrogen, and sufficient fluorine charged into the reactor to yield an initial pressure of approximately 800 lbs/sq.in. at a temperature between approximately −10° C. and 0° C. and to give a stoichiometric excess of approximately 200%. The refrigerant may then be removed, and the reactor temperature will increase without application of external heat until, at a pressure of approximately 800 lbs/sq.in. and at a temperature between approximately −10° C. and 0° C., a vigorous and virtually instantaneous reaction occurs, generating high temperatures and pressures and yielding uranium hexafluoride and oxygen. During the reaction, depending upon the reactor size and the amounts of fluorine and uranium oxide, peak pressures of approximately 3–4,000 lbs/sq.in. and temperatures of approximately 500°–600° C. may be temporarily experienced. Upon conclusion of the reaction, as indicated by a pressure and temperature drop, the reactor may be cooled to solidify the uranium hexafluoride product, and the residual fluorine and oxygen gases removed from the reactor together with any volatile impurities. The uranium hexafluoride product may then be sublimed away from any other impurity, such as the product of the fluorine-activator reaction. If the product is meant for isotopic analysis, it may be sublimed directly into the ionization chamber of a mass spectrometer.

In the event it is suspected that the uranium oxide sample contains impurities, particularly organic impurities, it may be desirable to briefly contact the sample with gaseous fluorine at the ambient atmospheric temperature to remove such impurities prior to the above sequence. This may prevent the violent explosions characteristic of elevated-pressure reactions of organic materials with fluorine.

The following examples are offered to illustrate my invention in greater detail.

EXAMPLE 1

Approximately 1.5 gram of comminuted $U_3O_8$ and 0.5 mg. of KCl were introduced into the bottom portion of a small nickel tube reactor. of a volume of approximately 6.5 c.c. The reactor was then fastened to a conventional tube valve with a flare fitting, which in turn was connected to a 250 ml. gas burett. Air was evacuated from the reactor, the reactor placed in a bath of liquid nitrogen, and 500 ml. of fluorine was transferred (in two successive shots) from the burett into the reactor. The valve was closed, the liquid nitrogen bath removed, and the reactor temperature permitted to rise without application of external heat. When the pressure reached approximately 700 lbs/sq.in. and the temperature approximately 0° C., a reaction took place instantaneously, the pressure momentarily reaching 950 lbs/sq.in. and the temperature approximately 150° C., after which they gradually declined. The reactor was cooled to approximately −70° C. with a slush of dry ice and a freontype refrigerant in order to solidify the $UF_6$ product. Residual fluorine and the oxygen reaction product were removed by pumping, and the $UF_6$ withdrawn by sublimation. A quantitative conversion of $U_3O_8$ to $UF_6$ was obtained, and the total time, from the charging of the reactor to the removal of the product, was only approximately ten minutes.

EXAMPLE 2

Same as Example 1, except that 750 ml. fluorine was employed. Reaction occurred at a pressure of approximately 1000 lbs/sq.in. and at a temperature of approximately −10° C. The maximum pressure reached was approximately 1500 lbs/sq.in. and the maximum temperature approximately 200° C.

EXAMPLE 3

Same as Example 1, except that the activator was comminuted $Fe_2O_3$.

EXAMPLE 4

Same as example 1, except that the activator was comminuted $H_2SiO_3$.

It should be understood that the above examples are merely illustrative and not limitative of my invention. As used herein and in the appended claims, the term "uranium oxide" is intended to include $UO_3$, $UO_2$, $U_3O_8$ and mixtures thereof. Although my invention has been described particularly with reference to the preparations of small amounts of uranium hexafluoride, it should be apparent that it is inherently adaptable to large scale operations, even on a continuous basis, by appropriate engineering modifications considered to be within the skill of the art. My invention, therefore, should be limited only as is indicated by the appended claims.

Having thus described my invention, I claim as novel:

1. An improved method for the conversion of uranium oxide to uranium hexafluoride, which comprises introducing said oxide, together with a small amount of fluorine-reactive substance, selected from the group consisting of alkali chlorides, silicon dioxide, silicic acid, ferric oxide, and bromine, into a constant volume reaction zone, charging sufficient fluorine into said zone at a temperature below approximately 0° C. to provide an initial pressure of at least approximately 600 lbs/sq.in. at the ambient atmospheric temperature, and then permitting the temperature to rise in said reaction zone until reaction ensues.

2. The method of claim 1, wherein the amount of the fluorinereactive substance is at least approximately one part fluorine-reactive substance to approximately 2,000 parts uranium oxide, by weight.

3. The method of claim 1, wherein the fluorine-reactive substance is potassium chloride.

4. The method of claim 1, wherein the fluorine-reactive substance is silicic acid.

5. The method of claim 1, wherein the fluorine-reactive substance is silicon-dioxide.

6. The method of claim 1, wherein the fluorine-reactive substance is ferric oxide.

7. An improved method for the quantitative conversion of uranium oxide to uranium hexafluoride, which comprises introducing comminuted uranium oxide, together with a small amount of potassium chloride, into a constant volume reaction zone, introducing sufficient fluorine into said reaction zone at a temperature of approximately $-189°$ C. to yield an initial pressure of approximately 800 lbs/sq.in. between a temperature of approximately $-10°$ C. and $0°$ C. and to yield a stoichiometric excess of approximately 200%, and then permitting the temperature to rise in said reaction zone until, between a temperature of approximately $-10°$ C. and $0°$ C., reaction ensues.

* * * * *